US012591100B2

(12) United States Patent
Sakurai et al.

(10) Patent No.: US 12,591,100 B2
(45) Date of Patent: Mar. 31, 2026

(54) OPTICAL CABLE LAYING METHOD

(71) Applicant: NTT, Inc., Tokyo (JP)

(72) Inventors: Akira Sakurai, Musashino (JP);
Hiroaki Tanioka, Musashino (JP);
Shigekatsu Tetsutani, Musashino (JP);
Yusuke Yamada, Musashino (JP);
Masashi Kikuchi, Musashino (JP)

(73) Assignee: NTT, Inc., Tokyo (JP)

( * ) Notice: Subject to any disclaimer, the term of this patent is extended or adjusted under 35 U.S.C. 154(b) by 218 days.

(21) Appl. No.: 18/570,842

(22) PCT Filed: Jun. 16, 2021

(86) PCT No.: PCT/JP2021/022857
§ 371 (c)(1),
(2) Date: Dec. 15, 2023

(87) PCT Pub. No.: WO2022/264310
PCT Pub. Date: Dec. 22, 2022

(65) Prior Publication Data
US 2024/0288656 A1 Aug. 29, 2024

(51) Int. Cl.
*G02B 6/50* (2006.01)
*G02B 6/46* (2006.01)

(52) U.S. Cl.
CPC .............. *G02B 6/46* (2013.01); *G02B 6/504* (2013.01)

(58) Field of Classification Search
CPC .......... H02G 3/305; H02G 9/02; H02G 9/025; G02B 6/46; G02B 6/504
See application file for complete search history.

(56) References Cited

U.S. PATENT DOCUMENTS

| | | | | |
|---|---|---|---|---|
| 3,888,186 A | * | 6/1975 | Jentzsch | H02G 9/065 104/275 |
| 4,911,510 A | | 3/1990 | Jenkins | |
| 5,115,260 A | * | 5/1992 | Hayward | G02B 6/44765 385/100 |
| 5,879,109 A | | 3/1999 | Finzel et al. | |
| 6,184,474 B1 | * | 2/2001 | Craft, Jr. | H05K 5/0247 174/72 A |
| 6,202,565 B1 | * | 3/2001 | Henry | H02G 9/025 104/275 |
| 6,268,566 B1 | * | 7/2001 | Takiguchi | B60R 16/0215 174/72 A |
| 6,770,821 B2 | * | 8/2004 | Higgs | B60R 16/0215 174/97 |

(Continued)

FOREIGN PATENT DOCUMENTS

| | | |
|---|---|---|
| JP | H02-501168 A | 4/1990 |
| JP | H05-071111 A | 3/1993 |

(Continued)

OTHER PUBLICATIONS

Riley Freeland et al., "Strain Sensing of an In-Road FTTH Field Trial and Implications for Network Reliability", Proc. of IWCS (2019).

*Primary Examiner* — Benjamin F Fiorello

(57) ABSTRACT

In order to achieve the foregoing object, the optical cable laying method of the present disclosure lays an optical cable on a road surface or a wall surface so that the optical cable passes through two points along a route therebetween longer than a minimum distance therebetween.

6 Claims, 19 Drawing Sheets

[8]

(56)     References Cited

U.S. PATENT DOCUMENTS

| | | | |
|---|---|---|---|
| 7,394,025 B1 * | 7/2008 | Wong | H02G 3/305 |
| | | | 104/275 |
| 2002/0061231 A1 | 5/2002 | Finzel et al. | |
| 2004/0115004 A1 * | 6/2004 | Serrano | H02G 1/06 |
| | | | 405/176 |
| 2010/0282352 A1 * | 11/2010 | Maue | H02G 9/025 |
| | | | 138/104 |
| 2017/0207612 A1 * | 7/2017 | Handler | H02G 9/025 |
| 2018/0017750 A1 * | 1/2018 | Clatanoff | C09J 7/22 |
| 2019/0033550 A1 * | 1/2019 | Turner | E01C 23/0993 |
| 2020/0409011 A1 * | 12/2020 | Dupuis | C09J 7/20 |

FOREIGN PATENT DOCUMENTS

| | | | |
|---|---|---|---|
| JP | H10-104439 A | 4/1998 |
| JP | H10262309 A | 9/1998 |
| JP | 2000-035516 A | 2/2000 |
| JP | 2001-524218 A | 11/2001 |
| JP | 2003-028729 A | 1/2003 |
| JP | 2009-288382 A | 12/2009 |

* cited by examiner

[1]

[2]

[3]

[4]

[5]

[6]

[7]

[8]

[9]

[12]

[13]

[14]

[15]

[17]

[18]

[19]

OPTICAL CABLE LAYING METHOD

CROSS-REFERENCE TO RELATED APPLICATIONS

This application is a 371 U.S. National Phase of International Application No. PCT/JP2021/022857, filed on Jun. 16, 2021. The entire disclosure of the above application is incorporated herein by reference.

TECHNICAL FIELD

The present disclosure relates to an optical cable laying method.

BACKGROUND ART

Currently, optical cables are laid in the ground and in the air in order to pull the optical cables into a user's house. When connecting an optical cable to another optical cable (see, for example, PTL 1) or when making a connection by truncating a defective part in the event of an optical cable failure, a connection point is established by utilizing the extra length of the cable. When laying optical cables underground, optical cables are distributed in an area where a certain amount of space is reserved, such as communication tunnels, manholes, and hand holes. On the other hand, when laying optical cables in the air, the optical cables are attached between poles. In both cases, underground and in the air, a large space exists, and this space has been used to secure the extra length.

On the other hand, in recent years, in order to meet the ever-increasing demand for optical communications, in addition to laying optical cables underground or in the air as described above, optical cables may also be laid on a road surface in order to lay the optical cables more economically and quickly (see, for example NPL 1).

CITATION LIST

Patent Literature

[PTL 1] Japanese Patent Application No. 5015083 (NTT)

Non Patent Literature

[NPL1] Strain Sensing of an In-Road FTTH Field Trial and Implications for Network Reliability, Proc. of IWCS (2019)

SUMMARY OF INVENTION

Technical Problem

However, when laying an optical cable on a road surface or a wall surface, there is no wide space such as underground or in the air, making it difficult to secure the extra length.

Meanwhile, when the extra length of the optical cable is not securable, it is difficult to establish a connection, need of which arises with the optical cable laid completely. In this case, another optical cable is required to be additionally laid, which is not preferable from the perspective of economical efficiency and quick laying of the optical cable. Therefore, it is necessary to secure the extra length of the optical cable.

An object of the present disclosure is to solve the above problem and to secure an extra length of an optical cable in laying the optical cable on a road surface or a wall surface.

Solution to Problem

In order to achieve the foregoing object, an optical cable laying method of the present disclosure lays an optical cable on a road surface or a wall surface so that the optical cable passes through two points along a route therebetween longer than a minimum distance therebetween.

For example, the optical cable laying method according to the present disclosure includes:

installing a laying band, for keeping an optical cable embedded therein, on the road surface or the wall surface;

making one or a plurality of incisions in the installed laying band so as to pass through the two points along routes each of which is longer than the minimum distance; and embedding the optical cable in one of the made incisions.

For example, the optical cable laying method according to the present disclosure includes:

installing a laying band in which one or a plurality of incisions are made beforehand so as to pass through the two points along routes each of which is longer than the minimum distance, on the road surface or the wall surface; and embedding the optical cable in one of the incisions of the installed laying band.

For example, the optical cable laying method according to the present disclosure includes:

installing a laying band for laying an optical cable in the road surface or the wall surface;

making a band-like incision in the installed laying band; and laying the optical cable so as to pass through the two points along the route longer than the minimum distance in the made band-like incision.

For example, the optical cable laying method according to the present disclosure includes:

installing a laying band in which a band-like incision is made beforehand, on the road surface or the wall surface; and laying the optical cable so as to pass through the two points along the route longer than the minimum distance in the band-like incision of the installed laying band.

For example, the optical cable laying method according to the present disclosure includes:

laying the optical cable and two laying bands whose side surfaces are concave/convex shapes occluding each other, on the road surface or the wall surface so as to make the optical cable sandwiched between the side surfaces of the two laying bands.

For example, the optical cable laying method according to the present disclosure includes:

laying two laying bands, with a space therebetween, and the optical cable, so as to pass through the two points along the route longer than the minimum distance in the space, on the road surface or the wall surface.

For example, the optical cable laying method according to the present disclosure includes:

engraving one or a plurality of grooves on the road surface or the wall surface so as to pass through the two points along routes each of which is longer than the minimum distance; and embedding the optical cable in one of the engraved grooves.

For example, the optical cable laying method according to the present disclosure includes:

engraving a band-like groove on the road surface or the
wall surface; and laying the optical cable so as to pass through the two
points along the route longer than the minimum dis-
tance in the engraved band-like groove.

For example, in the optical cable laying method according
to the present disclosure, passing through the two points along the route longer than
the minimum distance means meandering through the
two points.

Each of the inventions described above can be combined
as much as possible.

Advantageous Effects of Invention

According to the present disclosure, in laying an optical
cable on a road surface or a wall surface, an extra length of
the optical cable can be secured.

DESCRIPTION OF EMBODIMENTS

Figure 1:
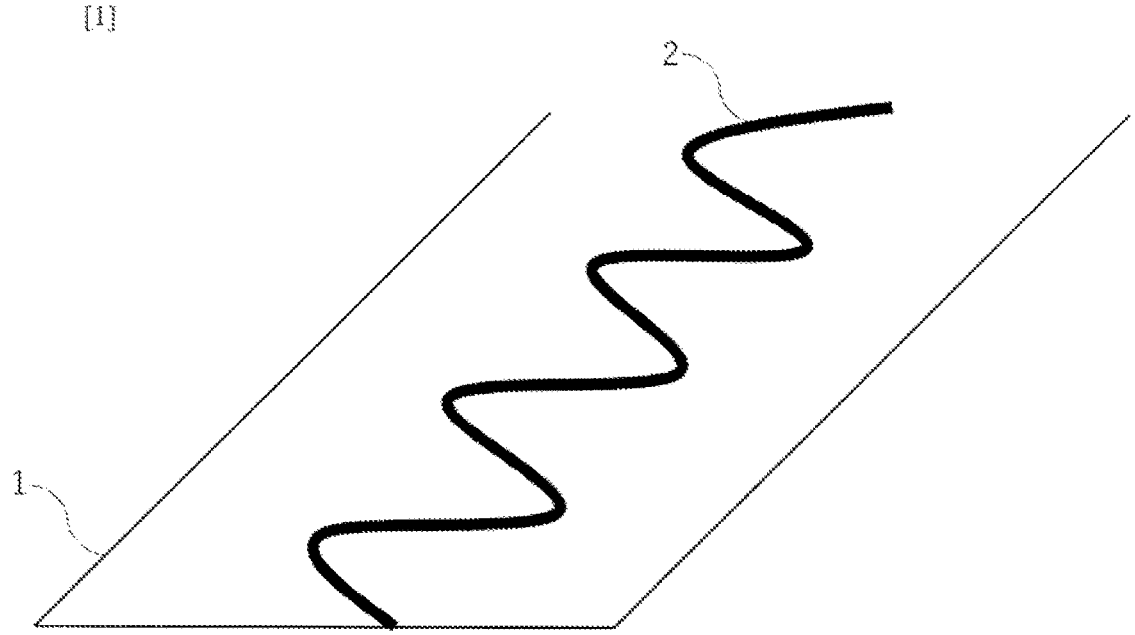
FIG. 1 is a diagram for explaining an optical cable laying
method.

Embodiments of the present disclosure will be described
hereinafter in detail with reference to the drawings. It is to
be understood that the present disclosure is not limited to the
embodiments described below. The embodiments are merely
exemplary and the present disclosure can be implemented in various modified and improved modes based on knowledge
of those skilled in the art. Constituent elements with the
same reference signs in the present specification and in the
drawings represent the same constituent elements.

In the drawings of the following embodiments, reference
numeral 1 denotes a road surface, 2 denotes an optical cable,
4 denotes an incision, and 5 denotes a groove. Further, the
following embodiments describe a situation where the opti-
cal cable 2 is laid on the road surface 1, but the same is also
applied to a situation where the optical cable 2 is laid on a
wall surface (not shown).

Embodiment 1

An example of an optical cable laying method according
to the present disclosure will be described with reference to
FIG. 1. In the optical cable laying method of the present
embodiment, the optical cable 2 is laid in a meandering
manner so as not to pass through two points on the road
surface 1 along a route of the minimum distance therebe-
tween. The shape of the laying of the optical cable 2 is not
limited to the shape of the laying shown in FIG. 1, and may
be any shape as long as the cable length of the laid optical
cable 2 is longer than the shortest distance where the optical
cable 2 can be laid. Further, the road surface 1 as a place to
install the cable is an example; the cable may be installed on
a wall surface or the like.

The laid optical cable 2 is fixed on the road surface 1 in
a meandering manner. The fixing method may be any
method as long as the fixture can be removed in making up
an extra length of the optical cable 2; the optical cable 2 may
be fixed on the road surface 1 by using a fixing tool such as
a wiring fastener, or bonded to the road surface 1 by an
adhesive.

It is preferred that the laid optical cable 2 be covered with
a certain protector. For example, a laying band may be
installed on the road surface 1 so as to cover the optical cable
2. In this manner, the optical cable 2 can be protected.

Figure 2:
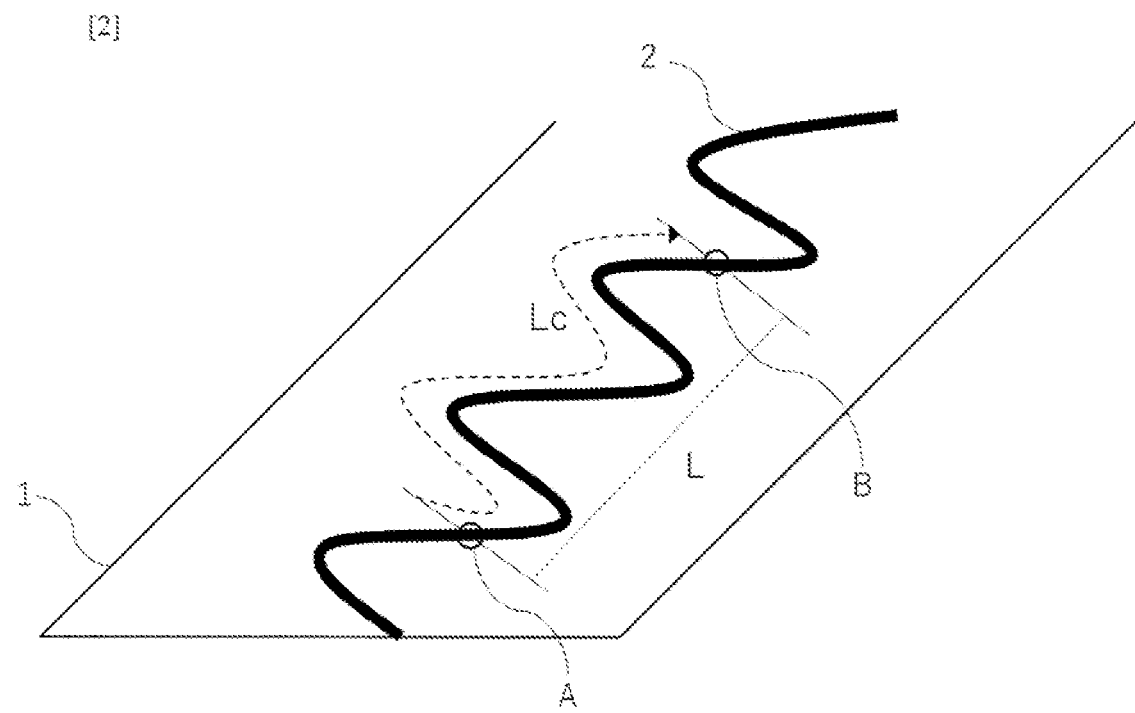
FIG. 2 is a diagram for explaining the makeup of an extra
length of an optical cable.

A method of making up the excess length of the optical
cable 2 will be described with reference to FIG. 2. As shown
in FIG. 2, Lc is the optical cable length between certain two
points A and B on the laid optical cable 2 (hereafter,
"between A and B" is abbreviated as "between AB"), and L
is the linear distance between AB. The fixture on the optical
cable 2 between AB is removed, and the optical cable 2, on
which the fixture is removed, is laid again on a straight line
between AB, thereby making up the excess length of Lc-L
at the maximum. Further, the optical cable 2, on which the
fixture is removed, may be laid again between the AB in a
meandering manner with small amplitude.

According to the optical cable laying method of the
present embodiment, the excess length of an optical cable
can be secured in laying the optical cable on a road surface
or a wall surface.

Embodiment 2

An example of the optical cable laying method according
to the present disclosure will be described with reference to
FIGS. 3 and 4. Reference numeral 3 denotes a laying band.
The laying band 3 is preferably made of an elastic material
such as rubber or resin so as to be able to smoothly deal with
the unevenness of the road surface 1 and absorb a side
pressure from above the laying band 3. When the laying
band 3 is long, rolling the laying band 3 makes it easy to transport it to a laying site. When the laying band 3 is composed of short and tile-like pieces, they can be stacked and transported.

Figure 3:
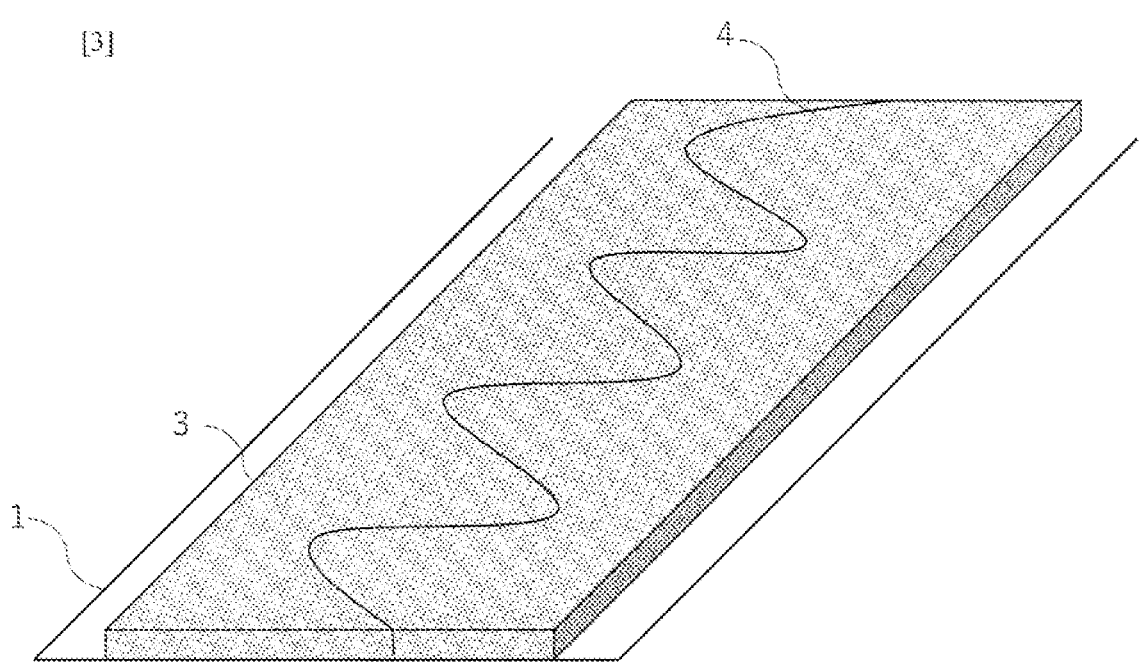
FIG. 3 is a diagram for explaining the optical cable laying
method.

FIG. 3 shows the laying band 3 having the incision 4 made therein. The incision 4 for laying the optical cable 2 is made in a meandering manner along a location, in the laying band 3, where the optical cable 2 is supposed to be laid, so as not to pass through two points along a route of the minimum distance therebetween on the road surface 1. The shape of the incision 4 is not limited to the shape of the incision shown in FIG. 3, and may be any shape as long as the cable length of the optical cable 2 laid in the incision 4 is longer than the shortest distance where the optical cable 2 can be laid.

The laying band 3 may be installed on the road surface 1 or a wall surface (not shown) in advance before making the incision 4, or may be installed after making the incision 4. When the incision 4 is made with the laying band 3 installed on the road surface 1 or the wall surface (not shown), the incision 4 of a desired shape can be made along a desired position depending on the environment where the laying band 3 is installed. In installing the laying band 3 on the road surface 1, the laying band 3 is stabilized by fixing the laying band 3 to the road surface 1 with an adhesive. The same applies to the situation where the laying band 3 is installed not only on the road surface 1 but also on the wall surface (not shown).

Figure 4:
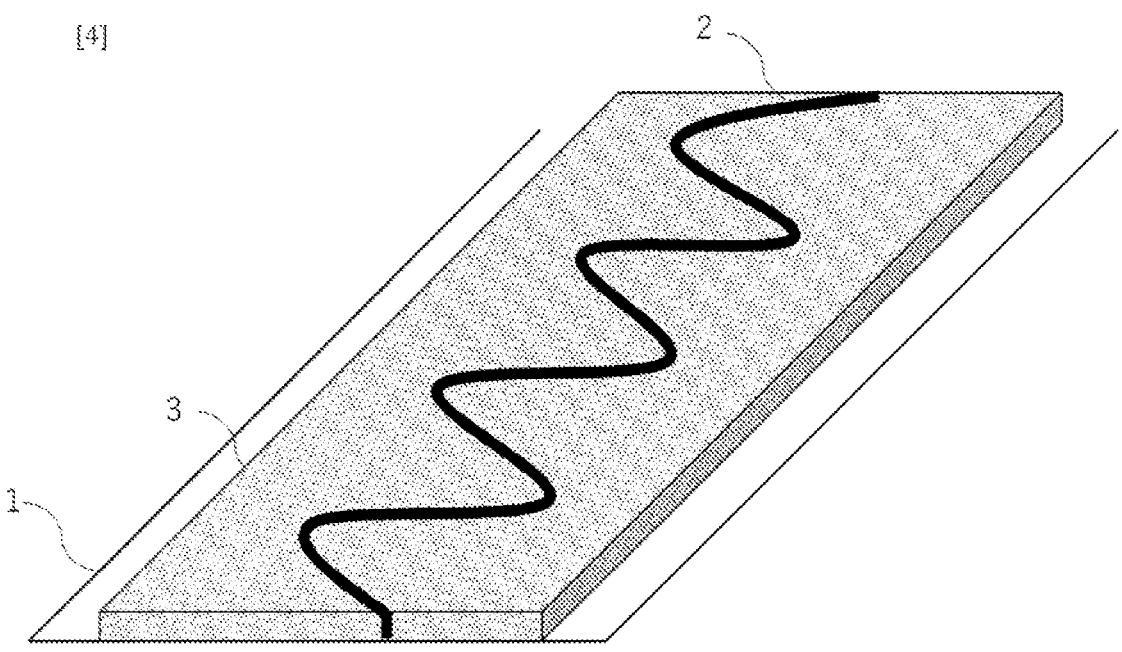
FIG. 4 is a diagram for explaining the optical cable laying
method.

FIG. 4 shows a state in which the optical cable 2 is embedded in the laying band 3. As shown in FIG. 4, the optical cable 2 is embedded in the meandering incision 4. It is preferred that an elastic material be used for the laying band 3 so as to close a cutting edge of the incision 4 after the optical cable 2 is embedded therein.

Figure 5:
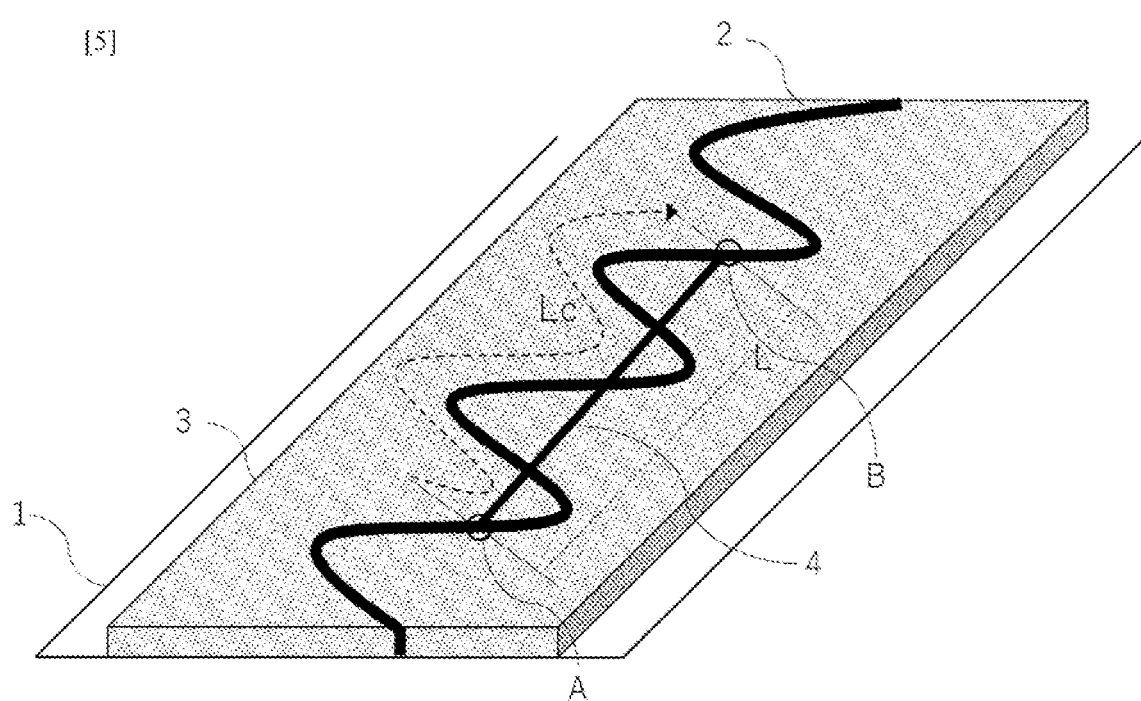
FIG. 5 is a diagram for explaining the makeup of an extra
length of an optical cable.

A method of making up the excess length of the optical cable 2 will be described with reference to FIG. 5. As shown in FIG. 5, a new incision 4 is made in the laying band 3 so as to linearly connect certain two points A and B thereon (hereinafter "between A and B" is abbreviated as "between AB"). Here, it is assumed that the optical cable length between AB is Lc and that the linear distance between AB is L. By laying the optical cable 2 again in the newly made incision 4, the maximum excess length Lc-L can be made up.

Alternatively, the newly made incision 4 may be made so as to connect the AB to each other in a meandering shape with small amplitude, and the optical cable 2 may be laid again in the newly made incision 4.

According to the optical cable laying method of the present embodiment, the excess length of an optical cable can be secured in laying the optical cable on a road surface or a wall surface.

Embodiment 3

An example of the optical cable laying method according to the present disclosure will be described with reference to FIGS. 6 and 7. Reference numeral 3 denotes a laying band. The configuration and installation method of the laying band 3 according to the present embodiment are the same as those of Embodiment 2 except for the incision 4.

Figure 6:
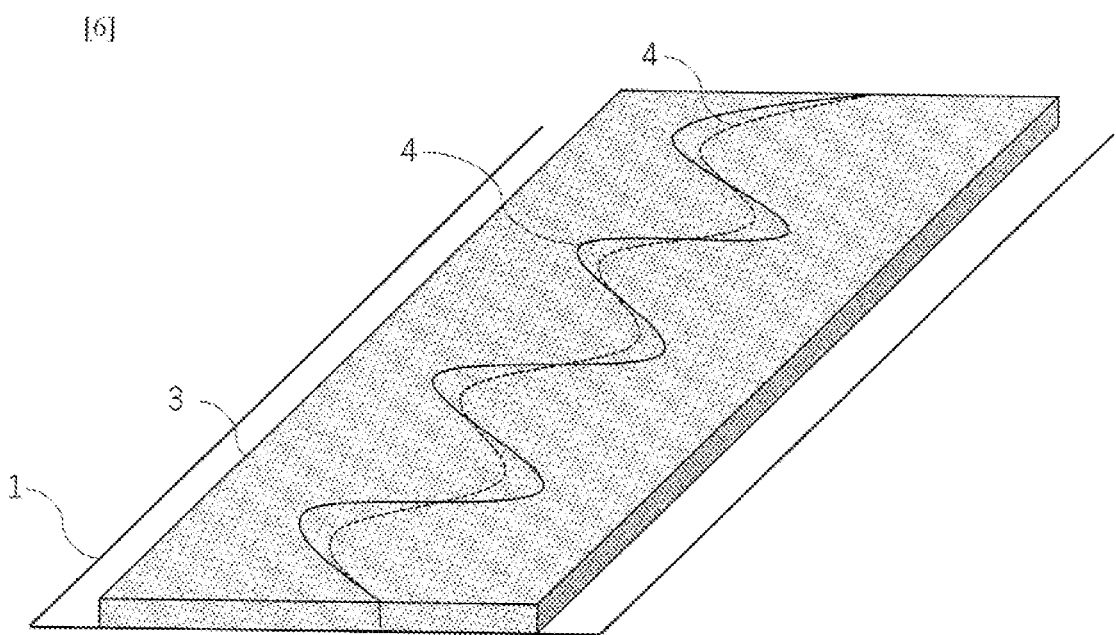
FIG. 6 is a diagram for explaining the optical cable laying
method.

FIG. 6 shows a laying band 3 having a plurality of incisions 4. A plurality of meandering incisions 4 for laying the optical cable 2 are made in the laying band 3. The method of making each of the plurality of incisions 4 is the same as that of Embodiment 2. Further, as shown in FIG. 4, the plurality of incisions 4 may be made so that the incisions 4 cross each other. By allowing the plurality of incisions 4 to cross each other, the plurality of incisions 4 are connected to each other, and the optical cable 2 can be laid more freely.

Figure 7:
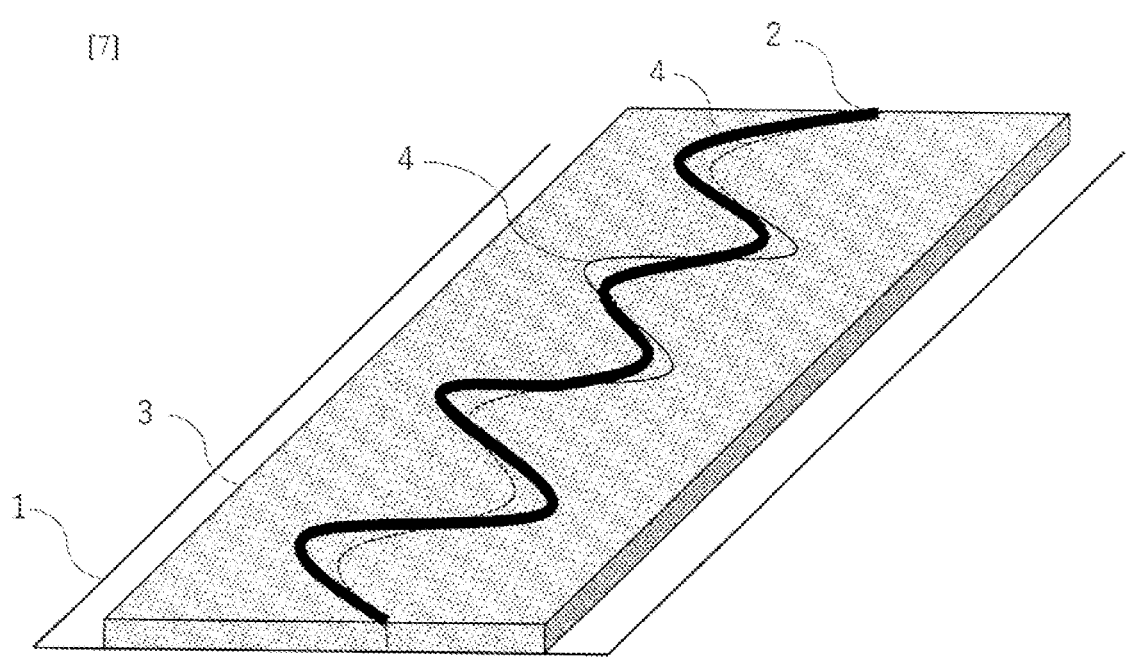
FIG. 7 is a diagram for explaining the optical cable laying
method.

FIG. 7 shows a state in which the optical cable 2 is embedded in the laying band 3. The optical cable 2 can be laid in any of the plurality of incisions 4 shown in FIG. 7. Furthermore, the optical cable 2 can be moved from one of the incisions 4 to another depending on the required extra length.

In addition, the incisions 4 can be made freely later depending on the required extra length. For example, as described in Embodiment 2, the incisions 4 may be newly made so as to connect certain two points of the embedded optical cable 2 linearly or in a meandering shape with a small amplitude. In this example, the extra length can be made up by re-installing the optical cable 2 in the same manner as in Embodiment 2.

According to the optical cable laying method of the present embodiment, the excess length of an optical cable can be secured in laying the optical cable on a road surface or a wall surface.

Embodiment 4

An example of the optical cable laying method according to the present disclosure will be described with reference to FIG. 8. Reference numeral 3 denotes a laying band. The configuration and installation method of the laying band 3 according to the present embodiment are the same as those of Embodiment 2 except for the incision 4.

Figure 8:
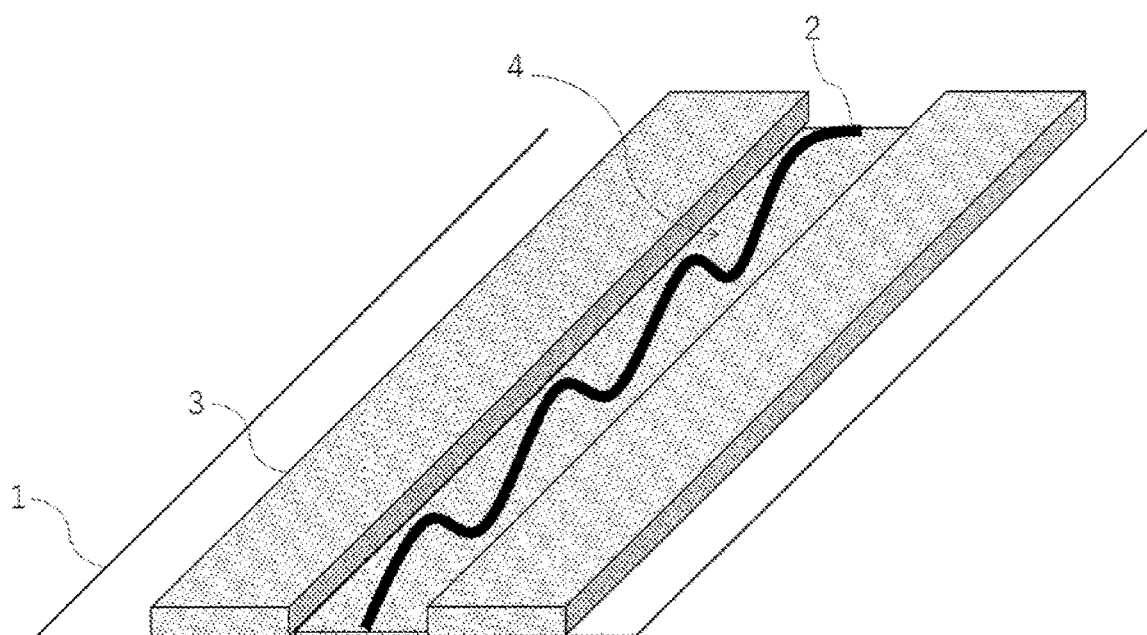
FIG. 8 is a diagram for explaining the optical cable laying
method.

FIG. 8 shows a state in which the optical cable 2 is laid on the laying band 3 having the incision 4 made therein. The band-like incision 4 for laying the meandering optical cable 2 is made along a position, in the laying band 3, where the optical cable 2 is supposed to be laid. The width and thickness of the band-like incision 4 are more than at least the diameter of the optical cable 2. The laying band 3 may be installed on the road surface 1 or the like in advance before making the band-like incision 4, or may be installed after making the incision 4. Preferably, the band-like incision 4 is made in advance before the laying band 3 is installed on the road surface 1 or the wall surface (not shown). When installing the laying band 3 on the road surface 1, the laying band 3 is stabilized by fixing the laying band 3 to the road surface 1 with an adhesive. The same applies to the situation where the laying band 3 is installed not only on the road surface 1 but also on the wall surface (not shown).

In the optical cable laying method according to the present embodiment, as shown in FIG. 8, the optical cable 2 is laid in a meandering manner so as not to pass through certain two points along a route of the minimum distance therebetween in the incision 4. The laying shape and the fixing method for the optical cable 2 are the same as those of Embodiment 1. In addition, the optical cable 2 can be freely moved in the band-like incision 4 depending on the required extra length. In addition, the extra length can be made up in the same manner as in Embodiment 1.

Figure 9:
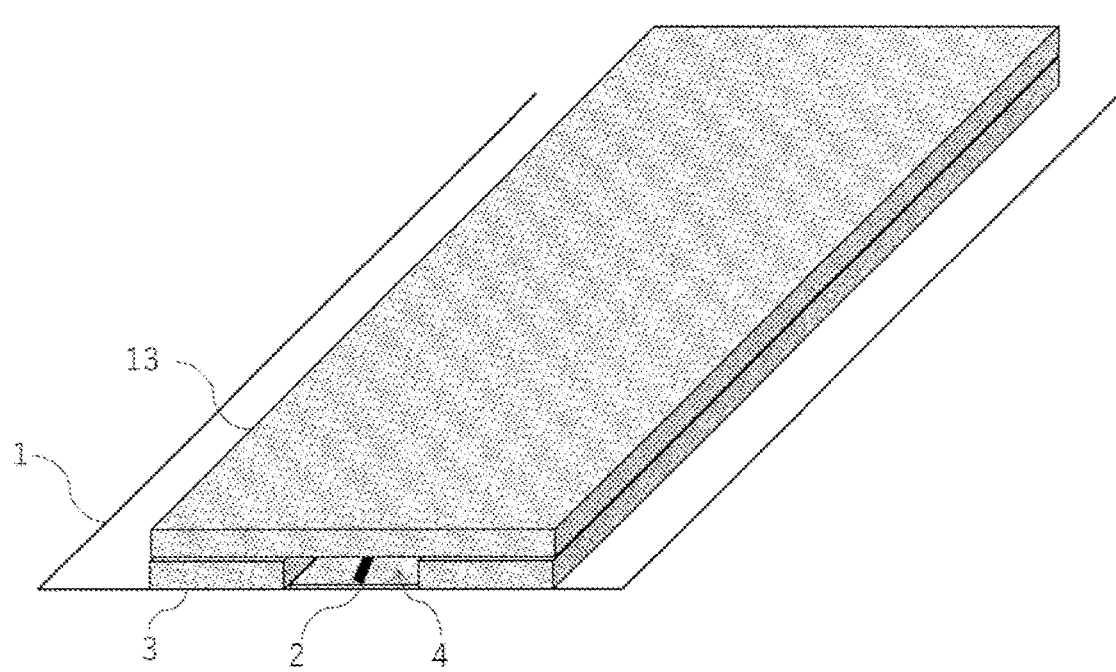
FIG. 9 is a diagram for explaining an optical cable
protection method.

FIG. 9 shows a state in which another laying band 13 is placed on the laying band 3. As shown in FIG. 9, another laying band 13 may be placed on the laying band 3 so as to cover at least the band-like incision 4. In this manner, the optical cable 2 can be protected.

The shape of the band-like incision 4 shown in FIGS. 8 and 9 is an example; the shape may be a shape other than the above as long as the optical cable 2 can be laid in a meandering manner in the incision 4.

According to the optical cable laying method of the present embodiment, the excess length of an optical cable can be secured in laying the optical cable on a road surface or a wall surface.

Embodiment 5

An example of the optical cable laying method according to the present disclosure will be described with reference to FIGS. 10 and 11. Reference numerals 31 and 32 denote laying bands. The configuration of the laying bands 31 and 32 is similar to that of the laying band 3 of Embodiment 2, except for the shapes of the incision and side surfaces.

Figure 10:
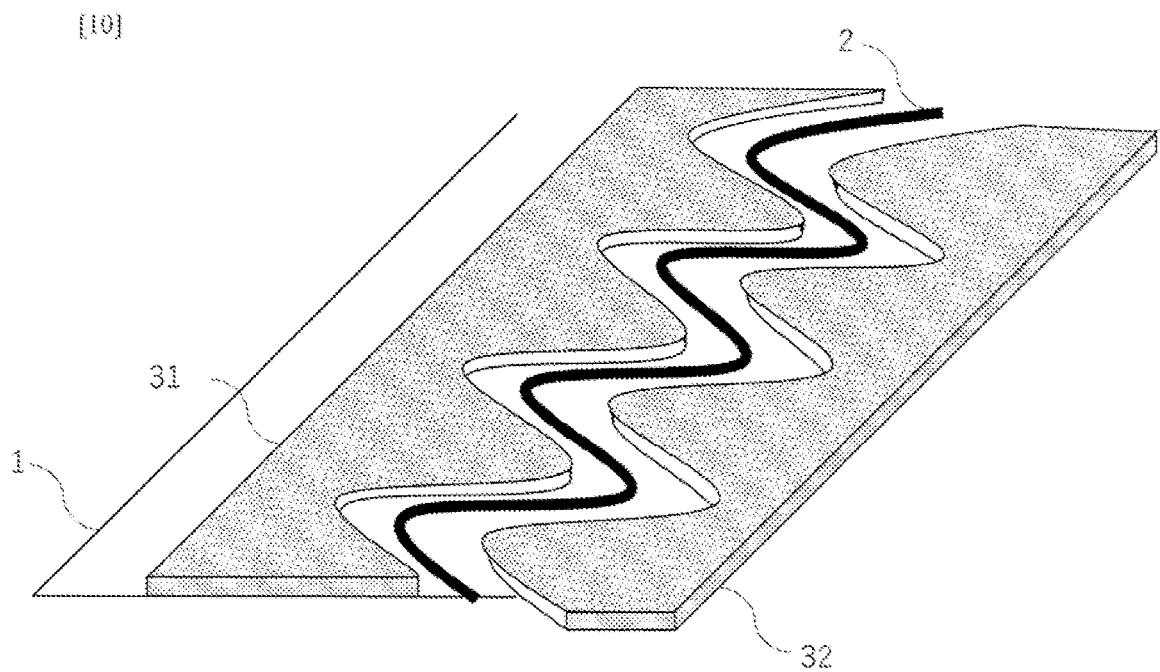
FIG. 10 is a diagram for explaining the optical cable
laying method.

FIG. 10 shows a state in which the laying band 31, the laying band 32, and the optical cable 2 are laid. As shown in FIG. 10, the laying band 31 and the laying band 32 have concave and convex shapes in which the side surfaces occlude each other.

The laying band 31 is laid on the road surface 1. The optical cable 2 is laid along the concave/convex-shaped side face of the laid laying band 31. The laying band 32 is laid on the road surface 1 so as to make the optical cable 2 sandwiched between the concave/convex-shaped side surfaces of the laying band 31 and the laying band 32 that occlude each other. When laying the laying band 31 and the laying band 32 on the road surface 1, the two laying bands 31 and 32 are stabilized by fixing them to the road surface 1 by an adhesive. The same applies to the situation where the laying band 31 and the laying band 32 are laid not only on the road surface 1 but also on the wall surface (not shown). The order in which the laying band 31 and the laying band 32 are laid may be reversed.

In the description of FIG. 10, after laying the laying band 31 on the road surface 1 or the wall surface, the optical cable 2 is laid, the laying band 32 is laid, and the optical cable 2 is sandwiched, but the optical cable 2 may be laid after laying the laying band 31 and the laying band 32. In a state where the optical cable 2 is sandwiched between the laying bands 31 and 32, they may be collectively laid on the road surface 1 or the wall surface.

Figure 11:
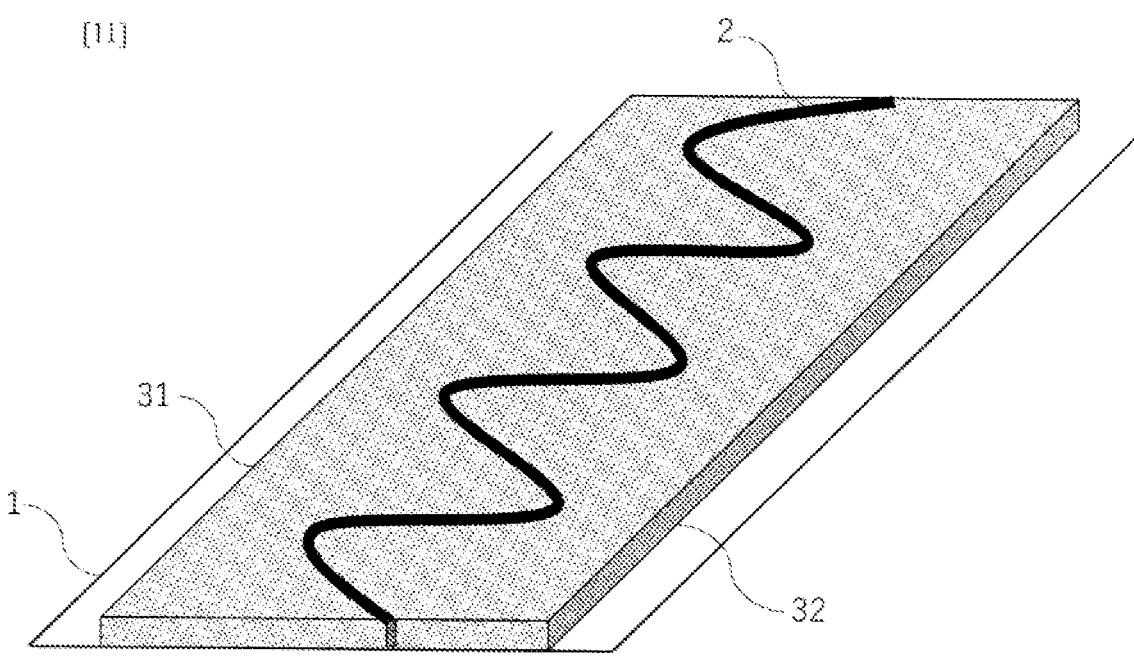
FIG. 11 is a diagram for explaining the optical cable
laying method.

FIG. 11 shows a state in which the optical cable 2 is sandwiched between the side surfaces of the laying band 31 and the laying band 32. The optical cable 2 is laid along the concave/convex shape of the side surfaces of the two laying bands 31 and 32, so that the optical cable 2 can be laid in a meandering manner so that the cable length becomes longer than the shortest distance where the optical cable 2 can be laid.

As in Embodiment 2, the extra length can be made up by newly making incisions in the two laying bands 31 and 32 so as to connect certain two points of the embedded optical cable 2 linearly or in a meandering shape with a small amplitude, and re-installing the optical cable 2.

According to the optical cable laying method of the present embodiment, the excess length of an optical cable can be secured in laying the optical cable on a road surface or a wall surface.

Embodiment 6

An example of the optical cable laying method according to the present disclosure will be described with reference to FIG. 12. Reference numerals 31 and 32 denote laying bands. The configuration of the laying band 31 and the laying band 32 is the same as that of the laying band 3 of Embodiment 2, except for the incision.

Figure 12:
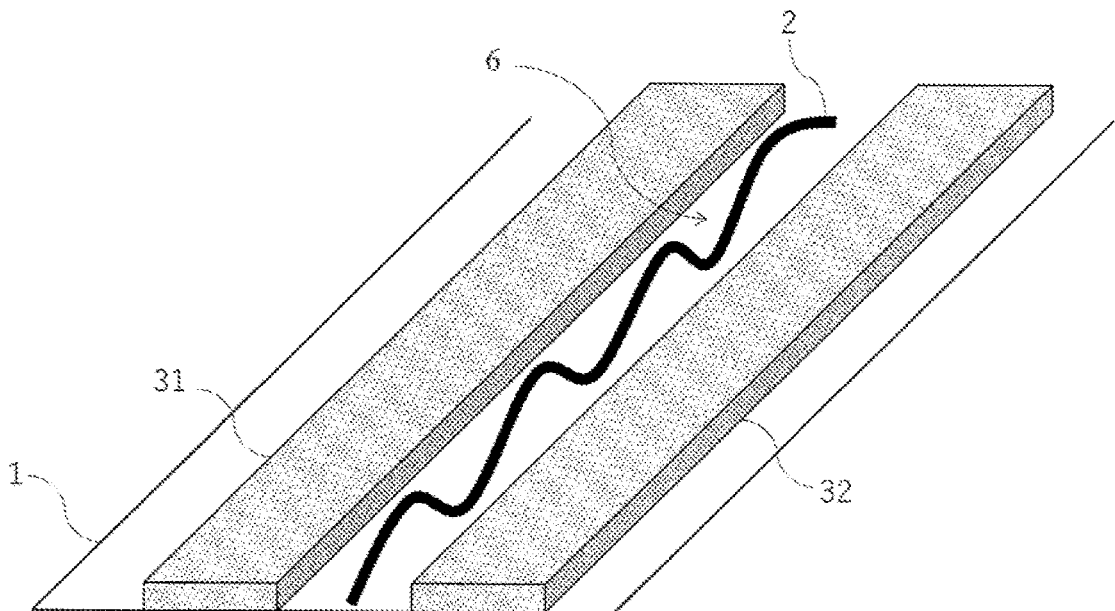
FIG. 12 is a diagram for explaining the optical cable
laying method.

FIG. 12 shows a state in which the laying band 31, the laying band 32, and the optical cable 2 are laid. As shown in FIG. 12, the two laying bands 31 and 32 are laid with a space 6 therebetween, and the optical cable 2 is laid in a meandering manner on the road surface 1 in the space 6. The order in which the laying band 31, the laying band 32, and the optical cable 2 are laid can be any order. Specifically, after the optical cable 2 is laid in a meandering manner, the laying bands 31 and 32 may be laid apart from each other, one by one or at once, on both sides of the optical cable 2. Also, the laying band 31 and the laying band 32 may be laid with the space 6 therebetween, and the optical cable 2 may be laid in a meandering manner on the road surface 1 in the space 6.

In installing the laying band 31 and the laying band 32 on the road surface 1, the laying band 31 and the laying band 32 are stabilized when fixed to the road surface 1 with an adhesive. The same applies to the situation where the laying band 31 and the laying band 32 are installed not only on the road surface 1 but also on the wall surface (not shown).

The laying shape and the fixing method of the optical cable 2 are the same as those of Embodiment 1. In addition, the optical cable 2 can be freely moved in the space 6 depending on the required extra length. In addition, the extra length can be made up in the same manner as in Embodiment 1.

Figure 13:
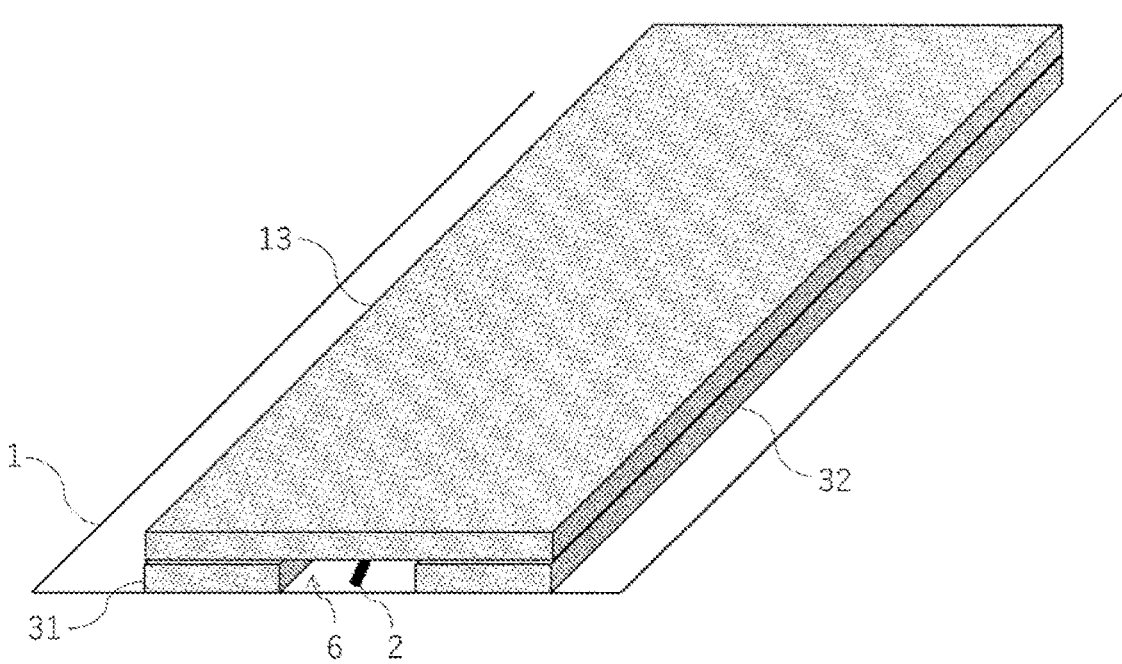
FIG. 13 is a diagram for explaining the optical cable
protection method.

FIG. 13 shows a state in which another laying band 13 is placed on the laying band 31 and the laying band 32. Another laying band 13 may be placed on the laying band 31 and the laying band 32 so as to cover at least the space 6. In this manner, the optical cable 2 can be protected.

According to the optical cable laying method of the present embodiment, the excess length of an optical cable can be secured in laying the optical cable on a road surface or a wall surface.

Embodiment 7

An example of the optical cable laying method according to the present disclosure will be described with reference to FIGS. 14 and 15.

Figure 14:
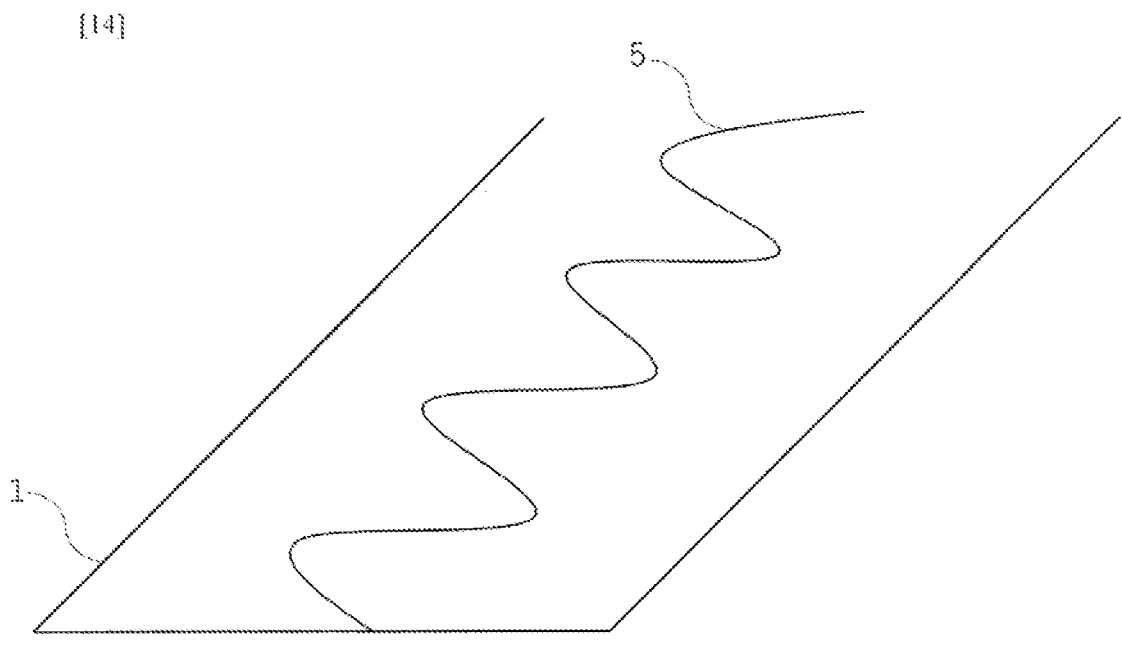
FIG. 14 is a diagram for explaining the optical cable
laying method.

FIG. 14 shows the road surface 1 having the groove 5 engraved thereon. The groove 5 for laying the optical cable 2 is engraved in a meandering manner along a position, on the road surface 1, where the optical cable 2 is supposed to be laid, so as not to pass through two points along a route of the minimum distance therebetween on the road surface 1. The shape of the groove 5 is not limited to the shape of the groove shown in FIG. 14, and may be any shape as long as the cable length of the optical cable 2 laid in the groove 5 is longer than the shortest distance where the optical cable 2 can be laid.

Figure 15:
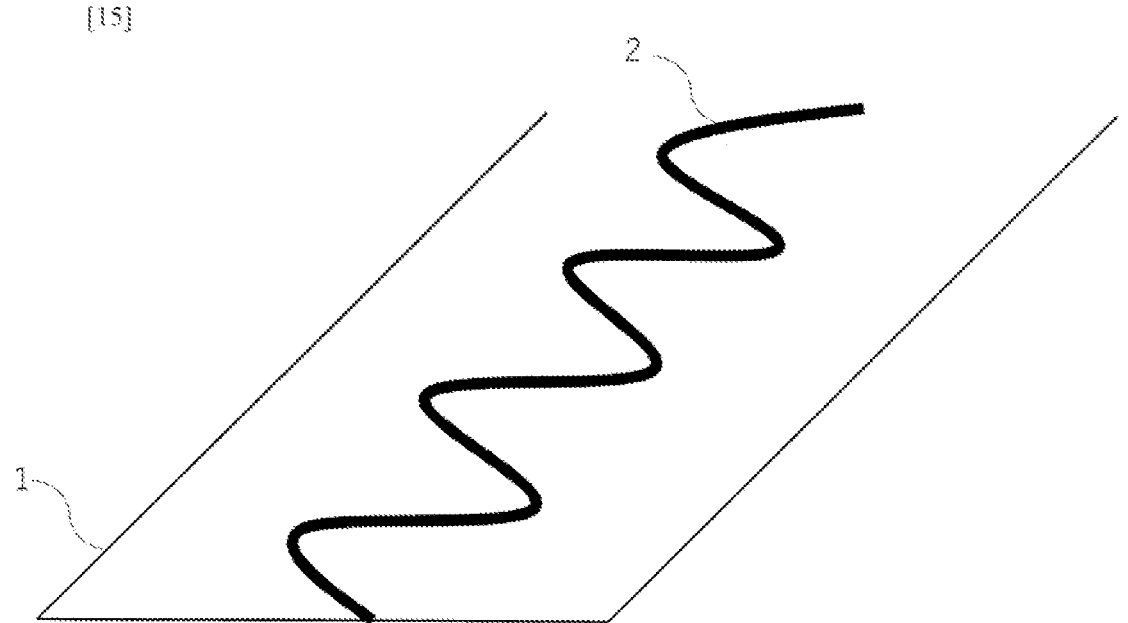
FIG. 15 is a diagram for explaining the optical cable
laying method.

FIG. 15 shows a state in which the optical cable 2 is embedded in the groove 5. The optical cable 2 is laid so as to be embedded in the meandering groove 5. Furthermore, the road surface 1 as a place to install the cable is an example; the cable may be installed on a wall surface or the like, for example.

Figure 16:
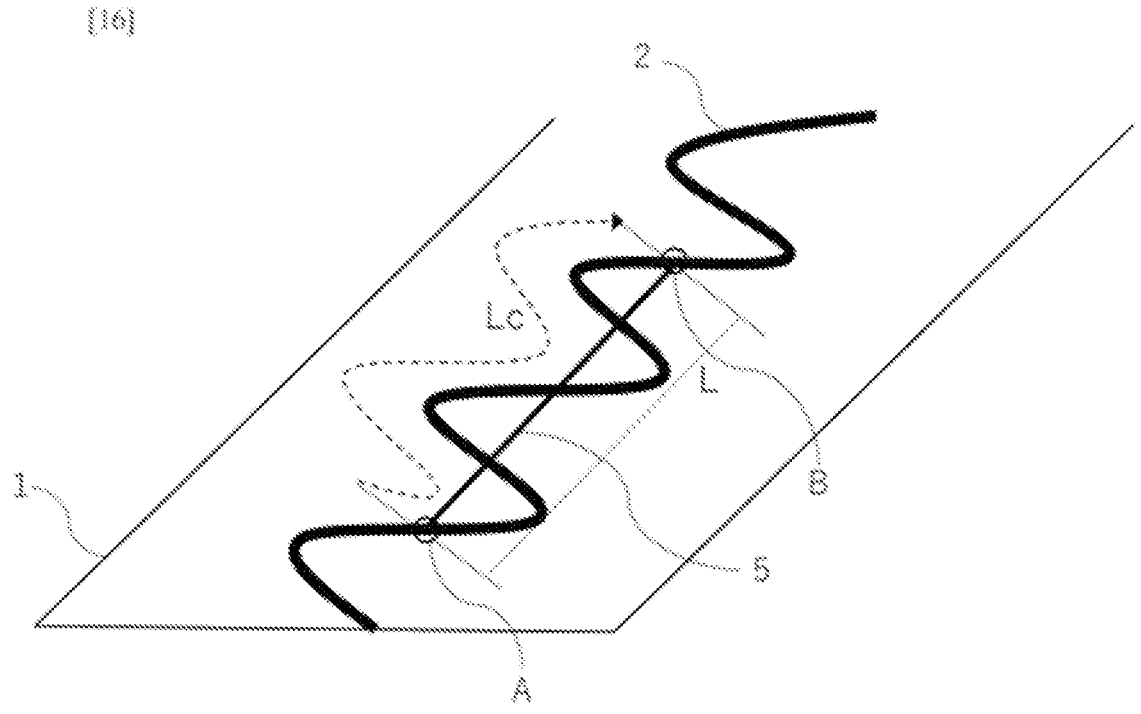
FIG. 16 is a diagram for explaining the makeup of an extra
length of an optical cable.

A method of making up the excess length of the optical cable 2 will be described with reference to FIG. 16. As shown in FIG. 16, a new groove 5 is engraved on the road surface 1 so as to linearly connect certain two points A and B (hereinafter "between A and B" is abbreviated as "between AB"). Here, it is assumed that the optical cable length between AB is Lc and that the linear distance between AB is L. By laying the optical cable 2 again in the newly engraved groove 5, the maximum excess length Lc-L can be made up. Alternatively, the newly engraved groove 5 may be engraved so as to connect the AB to each other in a meandering shape with small amplitude, and the optical cable 2 may be laid again in the newly engraved groove 5.

According to the optical cable laying method of the present embodiment, the excess length of an optical cable can be secured in laying the optical cable on a road surface or a wall surface.

Embodiment 8

Figure 17:
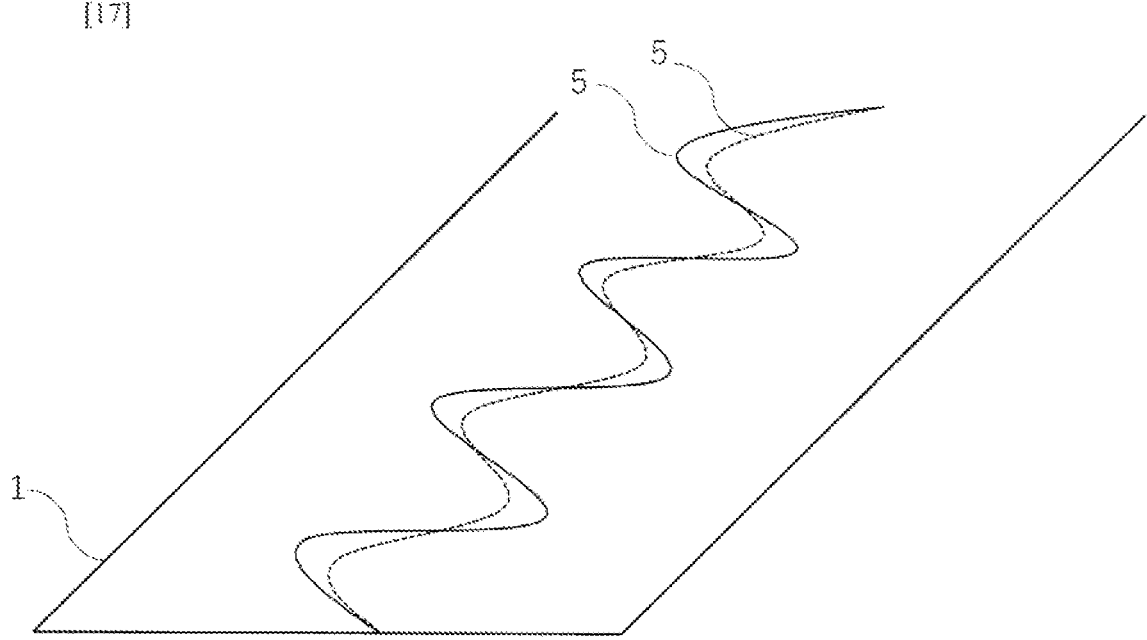
FIG. 17 is a diagram for explaining the optical cable
laying method.

FIG. 17 shows the road surface 1 having a plurality of grooves 5 engraved therein. The plurality of meandering grooves 5 for laying the optical cable 2 are engraved on the road surface 1. The method of engraving each of the plurality of grooves 5 is the same as that of Embodiment 7. As shown in FIG. 17, the plurality of grooves 5 may be engraved so that the grooves 5 cross each other. By allowing the plurality of grooves 5 to cross each other, the plurality of grooves 5 are connected to each other, and the optical cable 2 can be laid more freely.

The optical cable 2 can be laid in any of the plurality of grooves 5 shown in FIG. 17. In addition, the optical cable 2 can be freely moved to any of the grooves 5 depending on the required extra cable length.

The grooves 5 can be freely engraved later depending on the required extra length. For example, as described in Embodiment 7, a new groove 5 may be engraved so as to connect certain two points of the embedded optical cable 2 linearly or in a meandering shape with a small amplitude. In this example, the extra length can be made up by re-installing the optical cable 2 in the same manner as in Embodiment 7.

According to the optical cable laying method of the present embodiment, the excess length of an optical cable can be secured in laying the optical cable on a road surface or a wall surface.

Embodiment 9

A state of the optical cable 2 laid on the road surface 1 where the grooves 5 are engraved will be described with reference to FIG. 18. The band-like groove 5 for laying the meandering optical cable 2 is engraved along a position, on the road surface 1, where the optical cable 2 is supposed to be laid. The width and thickness of the band-like groove 5 are more than at least the diameter of the optical cable 2.

Figure 18:
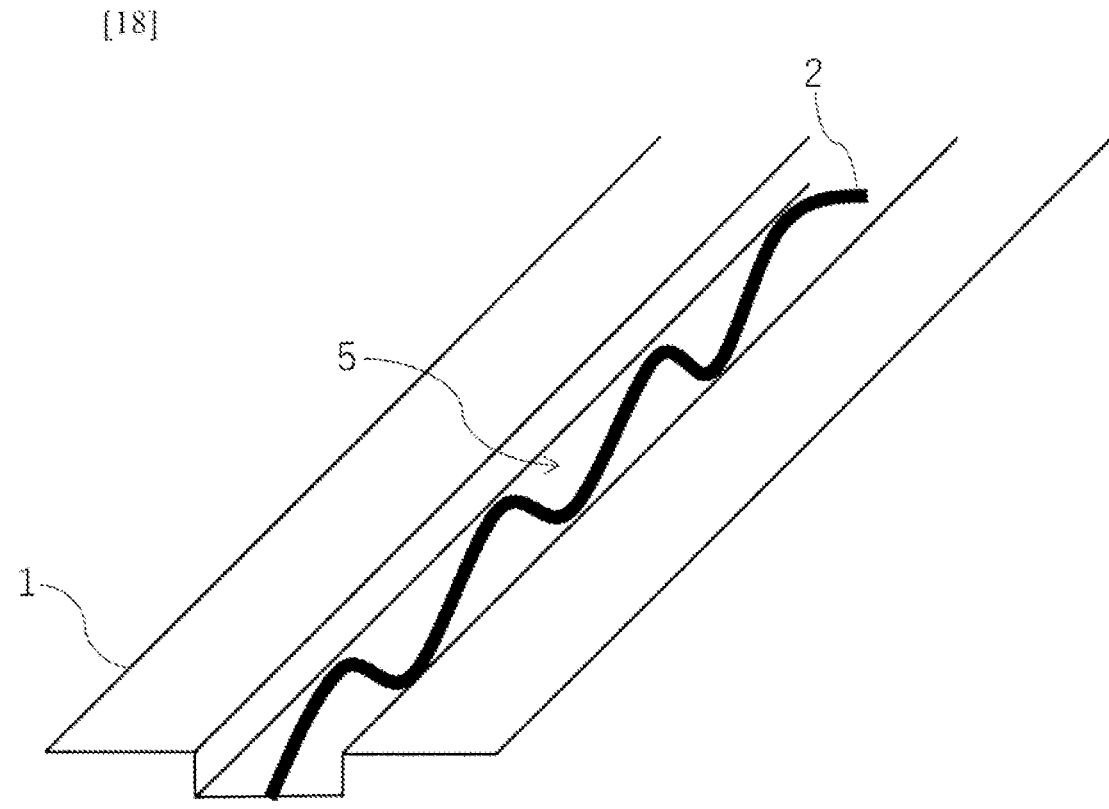
FIG. 18 is a diagram for explaining the optical cable
laying method.

In the optical cable laying method of the present embodiment, as shown in FIG. 18, the optical cable 2 is laid in a meandering manner in the groove 5 so as not to pass through certain two points along a route of the minimum distance therebetween. The laying shape and the fixing method of the optical cable 2 are the same as those of Embodiment 1. In addition, the optical cable 2 can be freely moved in the band-like groove 5 depending on the required extra length. In addition, the extra length can be made up in the same manner as in Embodiment 1.

Figure 19:
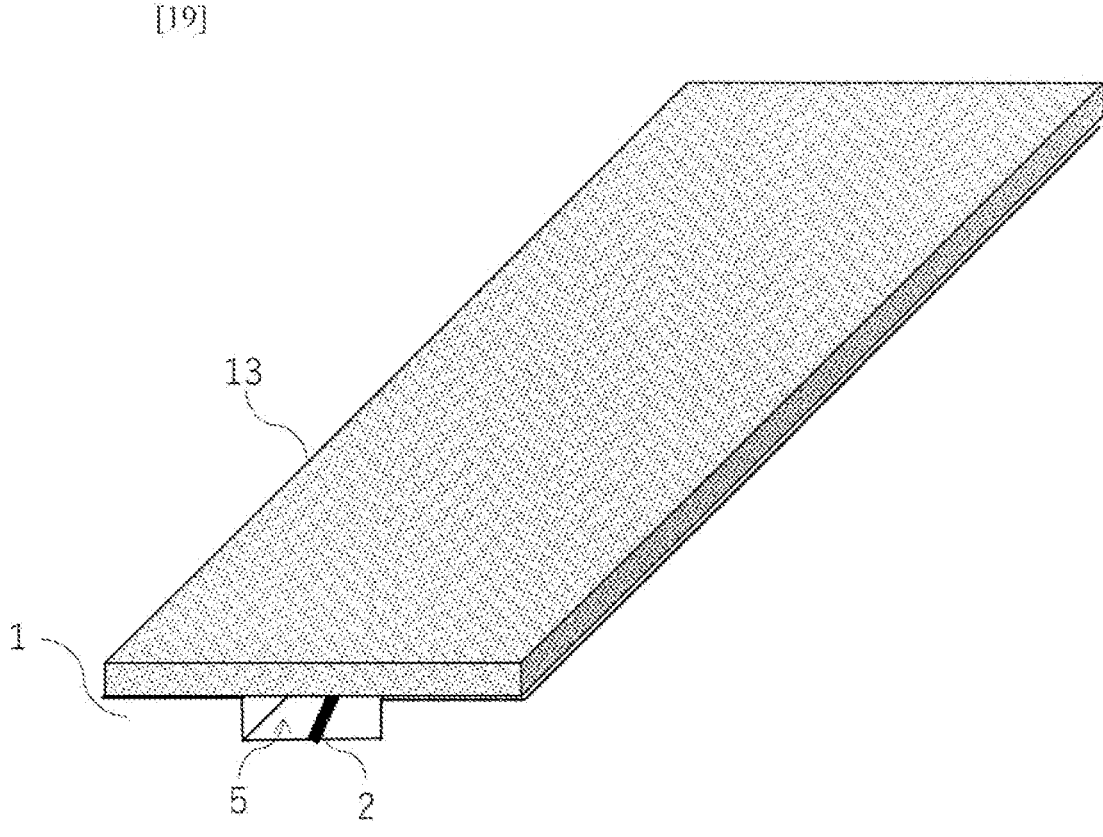
FIG. 19 is a diagram for explaining the optical cable
protection method.

FIG. 19 shows a state in which another laying band 13 is placed on the road surface 1. As shown in FIG. 19, another laying band 13 may be placed on the road surface 1 so as to cover at least the band-like groove 5. In this manner, the optical cable 2 can be protected.

The shape of the band-like groove 5 shown in FIGS. 18 and 19 is an example; the shape may be a shape other than the above as long as the optical cable 2 can be laid in a meandering manner in the groove 5.

According to the optical cable laying method of the present embodiment, the excess length of an optical cable can be secured in laying the optical cable on a road surface or a wall surface.

INDUSTRIAL APPLICABILITY

The optical cable laying method according to the present disclosure is applicable to information and communication industries.

REFERENCE SIGNS LIST

1: Road surface
2: Optical cable
3, 31, 32: Laying band
4: Incision
5: Groove
6: Space
13: Another laying band

The invention claimed is:

1. An optical cable laying method for laying an optical cable on a road surface or a wall surface so that the optical cable passes through two points along a route therebetween longer than a minimum distance therebetween, the method comprising installing a laying band for laying the optical cable in the road surface or the wall surface;

making a band-like incision in the installed laying band; and laying the optical cable so as to pass through the two points along the route longer than the minimum distance in the made band-like incision.

2. The optical cable laying method according to claim 1, further comprising laying the optical cable and two laying bands whose side surfaces are concave/convex shapes occluding each other, on the road surface or the wall surface so as to make the optical cable sandwiched between the side surfaces of the two laying bands.

3. The optical cable laying method according to claim 1, further comprising laying two laying bands, with a space therebetween, and the optical cable, so as to pass through the two points along the route longer than the minimum distance in the space, on the road surface or the wall surface.

4. The optical cable laying method according to claim 1, further comprising:

engraving one or a plurality of grooves on the road surface or the wall surface so as to pass through the two points along the route longer than the minimum distance; and embedding the optical cable in one of the engraved grooves.

5. The optical cable laying method according to claim 1, further comprising:

engraving a band-like groove on the road surface or the wall surface; and laying the optical cable so as to pass through the two points along the route longer than the minimum distance in the engraved band-like groove.

6. The optical cable laying method according to claim 1, wherein passing through the two points along the route longer than the minimum distance means meandering through the two points.

* * * * *